Patented July 30, 1940

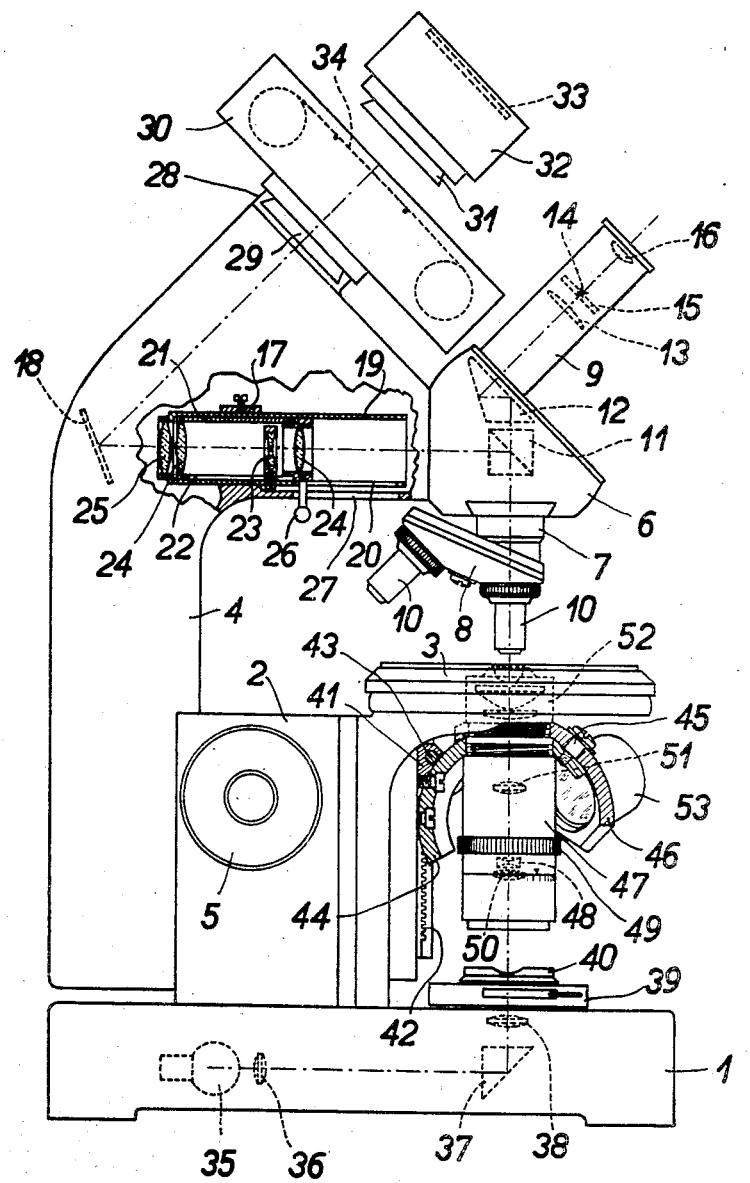

2,209,532

UNITED STATES PATENT OFFICE 2,209,532

MICROSCOPE

Kurt Michel, Jena, Germany, assignor to the firm Carl Zeiss, Jena, Germany

Application May 16, 1939, Serial No. 273,871
In Germany May 27, 1938

1 Claim. (Cl. 88—39)

Application was filed in Germany May 27,1938.

The invention concerns a microscope the optical imaging parts of which are fast with a bracket displaceable up and downwardly with respect to the parts of the microscope stand which support and illuminate the object to be imaged. The problem to be solved consists in constructing a microscope of this usual kind in which the microscopic object images produced in the field of view of the eye-piece can easily be photographed on a light sensitive-layer, and in which this exposure disturbs the continuation of the subjective examination as little as possible, the microscope being at any time ready for another exposure.

The invention solves this problem by coordinating to an eye-piece, which is mounted on the bracket and serves for the subjective observation of the object image produced by the microscope objective, a projection system and a reflecting system directing the imaging rays proceeding from the microscope objective to both the eye-piece and the projection system at one and the same time, the said projection system and the said reflecting system lying inside the bracket, and, further, by so disposing on the bracket a device for receiving the object image produced by the projection system that the entire path of the rays imaging the object lies inside the bracket. The reflecting system, consisting of plane mirrors or reflecting prisms, may be displaceable in part or entirely, so that the path of the imaging rays can be directed alternately to the eye-piece and to the projection system. This construction, in which the image is produced always by the entire quantity of the light at disposal and which, accordingly, provides images of the greatest possible luminous intensity, does not permit the continuation of the subjective observation during the exposure proper. An uninterrupted observation is possible, however, if the reflecting system has a ray dividing system which directs part of the light to each of the two optical imaging systems and need not, accordingly, be displaceable. The luminous intensity of the images thus obtained is naturally weaker, but this disadvantage can easily be overcome by illuminating the object by means of a light-source of a corresponding higher intensity. The image receiving device may be a disc of ground or clear glass or constitute a device which has a suitable light-sensitive layer assuming a corresponding position. The bracket of the microscope constitutes the micro-photographic camera, in which the path of the imaging rays is encased in a light-tight manner. It has proved to be specially advantageous to use as an image receiving device a small-film camera of the kind now to be had in commerce, this small-film camera offering the advantage that a comparatively great number of exposures can be made in rapid succession. The camera need not, of course, have a special photographic objective, since the object is optically imaged by the microscope objective and the projection system is disposed in the bracket.

To be prepared for all possibilities, the small-film camera can be attached to the bracket in such a manner as to be interchangeable with a focusing screen. To this effect, the image receiving device is conveniently equipped with a device permitting this change in a quick manner. The camera and the mount of the focusing screen can be fixed to the bracket for instance by means of suitable bayonet or locking devices, or both image receiving devices may be disposed on a common slide displaceable on the bracket, or on a revolving disc.

In the described constructional example of the microscope, the fine focusing of the image in the image plane of the image receiving device is effected by displacing the observation parts up and downwardly on the microscope stand. Working with the microscope is especially simple when care is taken that the image for subjective examination and the image in the image plane of the image receiving device are sharply focused when the bracket assumes one and the same height in both cases. As the visual faculties of observers naturally differ very often from each other, it is necessary to determine in the image field of the eye-piece a definite plane in which the object image is sharply focused. This is made possible by providing the eye-piece with a mark which indicates the image plane and making the projection screen to harmonize with the eye-piece in such a manner that the object is sharply imaged in both image planes. It is not necessary in this case that the magnifications be the same in both imaging ray paths. A special improvement can be arrived at, however, by using as a projection system a pancratic optical system which permits a continuous change in the magnification of the image in the image plane of the imaging receiving device without any change in the acuity of the image.

The accompanying drawing shows a constructional example of the invention in part-sectional elevation.

In this example, 1 is a foot supporting a column 2 holding a stage 3 and a bracket 4. This bracket 4, which can be adjusted up and downwardly relatively to the stage 3 by means of a milled head 5, is hollow and provided with a head 6 holding an eye-piece 9 and an attachment piece 7 for a revolving nose-piece 8. In this nose-piece 8 are mounted microscope objectives 10. The head 6 contains a ray dividing system 11, which is a glass cube having a semi-transparently silvered diagonal surface, and a prism 12 for deviating to the eye-piece 9 the imaging rays traversing, and not deviated by, the glass cube 11. The optical parts of the eye-piece 9 are a field lens 13, a glass plate 15 having cross lines 14, and an eye-lens 16. The surface of the glass plate 15 carrying the cross lines 14 lies in the image plane of the eye-piece.

Into the bracket 4 is cast a bearing 17 the axis of which strikes the glass cube 11 as well as a plane mirror 18 disposed in and inclined relatively to the bracket 4. Into the bearing 17 is clamped a pancratic projection system the exterior tube 19 of which has a slit 20 parallel to its axis and contains a displaceable interior tube 21, which is provided with a slit 22 also parallel to the said axis. The optical parts of the pancratic system are a negative lens 23, which is fixed to the exterior tube 19 and whose mount extends through the slit 22 into the interior tube 21, two convergent lenses 24 mounted in the extremities of the interior tube 21, and a convergent lens 25 disposed on the one extremity of the exterior tube 19. The interior tube 21 containing the two lenses 24 is displaceable relatively to the lens 23 by means of a knob 26 which extends through a slit 27 in the bracket 4 and the slit 20 in the exterior tube 19 and is fast with the interior tube 21. The plane mirror 18 is so inclined that the rays leaving the pancratic system are directed upwardly at acute angles to where a slide changing device 28 is provided on the bracket 4. The changing device 28 receives the slide 29 of a small-film camera 30 or the slide 31 of an attachment 32 in the form of a box. This box 32 contains a focusing screen 33 the ground surface of which lies in the plane of the film 34 of the camera 30 when the box 32 is substituted on the changing device 28 for the camera 30. The camera 30 is assumed to be provided in the known manner with a shutter (not shown).

The illumination of the objects to be microscopically examined is effected by an incandescent lamp 35 and a lamp condenser 36. The lamp 35, the condenser 36, a reflecting prism 37 and a convergent lens 38 are disposed to this effect in the foot 1, which is hollow. The illumination rays directed by the lamp condenser 36 to the reflecting prism 37 are deviated by this prism 37 at 90° and directed to the convergent lens 38, whence they proceed to an iris diaphragm 39 placed on the foot 1 and carrying a mount 40 for light filtres.

Below the stage 3 is a slide 41, which is adjustable up and downwardly on the column 2 by means of a rack 42 and a pinion 43. To the slide 41 is screwed a revoluble condenser mount consisting of an interior bowl 44 on which a bowl 46 is rotatable about an axle 45. The bowl 44 carries a pancratic illumination system 47 the optical parts of which are a stationary negative lens 48 and two convergent lenses 50 and 51 on either side of this lens. The lenses 50 and 51 are conjointly displaceable along their axis by means of a knurled ring 49. By means of the bowl 46, condensers for different kinds of illumination can be placed alternately into the path of the illumination rays, for instance a light-field condenser 52, a condenser 53 for synoptic illumination, a cardioid condenser, or the like.

When the microscope is to be used, the preparation is placed on the stage 3 and, subsequently to the slide 41 having been lowered by means of the pinion 43, the condenser required for the intended observation placed in position by rotation of the exterior bowl 46 about its axle 45 until the optical axis of the respective condenser, for instance the light-field condenser 52, coincides with that of the pancrating illumination system 47. The apparatus is ready for use when the incandescent lamp 35 has been connected to a circuit and the slide 41 has been raised until the correct illumination of the object is arrived at and when, further, a suitable microscope objective 10 has been placed into the path of the illumination rays by means of the revolving nose-piece 8. The corrected illumination can be improved, eventually, by partly shutting the iris diaphragm 39 and placing a light filtre on the mount 40.

By looking into the eye-piece 9, it is now ascertained whether the object image produced by the objective 10 has been placed into the plane of the cross lines 14, which can be effected by raising or lowering the bracket 4 through the agency of the milled head 5. When the object image visible in the eye-piece 9 is to be photographed, the slide 31 is placed into the slide changing device 28, and the picture to be taken is viewed on the focusing screen 33. The acuity of the image can be improved also in this case by raising or lowering the bracket 4 by means of the milled head 5. When the image on the focusing screen 33 is exactly focused at, the magnification of the image can be changed, without the image acuity being altered, by displacing the knob 26 in the slit 27. It is obvious that, on account of the restricted area of the focusing screen 33, the imaged section of the object becomes the smaller the more the magnification of the image is increased, and the greater the more this magnification is decreased. The box 32 is now to be removed from the bracket 4 and the slide 29 of the small-film camera 30 to be inserted into the changing device 28, whereupon a photograph can be taken by operation of the shutter of the camera 30.

The eye-piece and the projection system of the instrument are conveniently made to harmonize with each other at the outset in such a manner that the object image is sharp in the plane of the film 34 when a sharp image of this object is seen in the plane containing the cross lines of the glass plate 15. The focusing screen 33 can be used in this case also for verifying the magnification of the image and the area of the section to be photographed. When, accordingly, the acuity of the image to be photographed is adjusted by means of the milled head 5, the focusing screen can be dispensed with, since this adjustment can be effected through the agency of the eye-piece 9. Instead of the slide changing device, naturally a revoluble or any other suitable changing device can be used for the substitution of the camera for the focusing screen.

I claim:

A microscope, said microscope consisting of a microscope stand, at least one microscope objective, a microscope eye-piece, a reflecting system, a projection system, a device for receiving the projected image, and an illumination device for the object to be imaged, said microscope stand comprising a microscope foot, a bracket and means for supporting the object to be imaged, said microscope objective and said microscope eye-piece being disposed above said supporting means on said bracket, said bracket being displaceably mounted on said microscope foot, said bracket being hollow, said reflecting system and said projection system being disposed in said bracket, said reflecting system having an element for dividing the pencil of imaging rays proceeding from said microscope objective into two pencils, said ray dividing element being disposed between said microscope objective and said microscope eye-piece and adapted to direct the one of said two pencils to said microscope eye-piece and the other of said two pencils to said projection system, said reflecting system having further a reflecting element for the deviation of the pencil traversing said projection system to said image receiving device, said image receiving device being disposed on said bracket, and said illumination device being disposed below said supporting means on said microscope foot.

KURT MICHEL.